US012039837B1

(12) United States Patent
Spencer

(10) Patent No.: US 12,039,837 B1
(45) Date of Patent: Jul. 16, 2024

(54) GAME SYSTEM

(71) Applicant: Cognitiv LLC, Mission Viejo, CA (US)

(72) Inventor: Shay Spencer, Mission Viejo, CA (US)

(73) Assignee: Cognitiv LLC, Mission Viejo, CA (US)

( * ) Notice: Subject to any disclaimer, the term of this patent is extended or adjusted under 35 U.S.C. 154(b) by 0 days.

(21) Appl. No.: 18/231,786

(22) Filed: Aug. 8, 2023

Related U.S. Application Data

(60) Provisional application No. 63/478,002, filed on Dec. 30, 2022.

(51) Int. Cl.
*G07F 17/32* (2006.01)

(52) U.S. Cl.
CPC ...... *G07F 17/3253* (2013.01); *G07F 17/3262* (2013.01)

(58) Field of Classification Search
CPC .. G07F 17/3253; G07F 17/3262; G07F 17/34; G07F 17/3295; G07F 17/3297
See application file for complete search history.

(56) References Cited

U.S. PATENT DOCUMENTS 8,052,518 B1 * 11/2011 Kelly .................. G07F 17/3258 463/16
10,593,161 B1 * 3/2020 Shoemaker, Jr. ....... G07F 13/06
2005/0035542 A1 * 2/2005 Hosaka ............... G07F 17/3297 273/120 R

FOREIGN PATENT DOCUMENTS

KR 101398509 B1 * 5/2014 ......... G07F 17/3244

* cited by examiner

*Primary Examiner* — Jasson H Yoo
(74) *Attorney, Agent, or Firm* — Innovent Law, P.C; Karima Gulick

(57) ABSTRACT

A game system according to the present disclosure includes a playfield and a prize dispenser. The playfield includes a peg board, a plurality of deflector pegs attached to the peg board, a plurality of exits located below the deflector pegs, and a detector coupled with a first prize exit of the plurality of exits and configured to generate a first winning signal when detecting the object traversing through the first prize exit. The prize dispenser includes a dispenser portion coupled with a prize source and configured to dispense a predetermined prize from the prize source, after receiving the first winning signal from the detector.

18 Claims, 8 Drawing Sheets

GAME SYSTEM

CROSS-REFERENCE TO RELATED APPLICATION

This application incorporates by reference and claims the benefit of priority to U.S. Provisional Application 63/478,002 filed on Dec. 30, 2022.

FIELD OF THE INVENTION

The present invention relates generally to gaming machine. More specifically, the present invention relates to a gaming machine having a drop zone and one or more objects which can be received at different positions of the drop zone to affect the prize associated with the position receiving the object.

BACKGROUND OF THE INVENTION

Description of the Related Art

Slot machines have been a dominant part of the gaming industry worldwide for over 50 years. While pachinko machines have seen a great deal of popularity in Asia, they are not as well suited for gaming as the traditional slot machine.

Slot machines have changed very little over the years. Whether mechanical or electronic, they still have reels spinning and coming to stop on a potential jackpot. It appears that a large part of the appeal of slot machines is the "mechanical" nature of the spinning reels which induces a belief in players that they are witnessing a truly random event and that the "big" jackpot is always just around the corner. While the big jackpot may or may not be just around the corner, slot machines maintain a very accurate payout percentage, usually between 92 and 99 percent with the house retaining the rest as profit.

One problem with the traditional slot machine is that real money is required to play the game. This requirement of money to play renders the slot machine unsuitable or undesirable in certain areas due to considerations such as legal requirements regarding gambling or patronage of underage people in the areas.

Another problem with the traditional slot machine is that the prize for winning the game is normally money. The lack of variety in prizes tends to reduce a potential customer's desire to play the game.

There is a demand for a gaming machine that is as attractive to garners interested in play slot machine but not interested in playing for money. There is a further demand for a gaming machine which gives out prize other than money. There is yet a further demand for a gaming machine configured to give out a variety of prizes depending on where the play object is received by the drop zone of the game machine.

SUMMARY OF THE DISCLOSURE

In one aspect, the present disclosure is embodied as a game system comprising a playfield and a prize dispenser. The playfield includes a peg board oriented substantially vertically, a plurality of deflector pegs attached to the peg board and oriented substantially horizontally, a plurality of exits located below the deflector pegs, wherein one of the exits receives the object traversing over the peg board and deflected by the deflector pegs. The playfield further includes an object introducer attached to the peg board and located above the deflector pegs, wherein the object introducer is configured to receive an object and drop the object onto the deflector pegs. The playfield also includes a detector coupled with a first prize exit of the plurality of exits and configured to generate a first winning signal when detecting the object traversing through the first prize exit.

The prize dispenser includes a dispenser portion coupled with a prize source and configured to dispense a predetermined prize from the prize source; wherein the dispense portion is signally coupled with the detector and configured to dispense the predetermined prize to free fall after receiving the first winning signal from the detector.

In one embodiment, the prize source has a first prize and a second prize. The detector is coupled with a second prize exit of the plurality of exits and configured to generate a second winning signal when detecting the object traversing through the second prize exit. The prize dispenser is configured to dispense the first prize to free fall after receiving the first winning signal from the detector. The prize dispenser is also configured to dispense the second prize to free fall after receiving the second winning signal from the In one embodiment, the prize source includes at least one drink. The dispenser portion includes a valve configured to couple with the prize source to receive the drink and a funnel coupled with the valve. The valve selectively closes or opens for the first drink to flow from the prize source, through the valve, and exit through the funnel.

In another embodiment, the prize source includes a first drink and a second drink. The detector is coupled with a second prize exit of the plurality of exits and configured to generate a second winning signal when detecting the object traversing through the second prize exit. The valve selectively closes or opens for the second drink to flow from the prize source, through the valve, and exit through the funnel, after the prize dispenser receives the second winning signal from the detector.

In another embodiment, the prize dispenser further includes a prize maker configured to receive the first drink and the second drink and create the predetermined prize to be dispensed. The game system also includes a player interface configured to receive a user input and adjust the predetermined prize to be dispensed from the prize dispenser.

DETAILED DESCRIPTION OF THE INVENTION

The embodiment and various other embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

Figure 1:
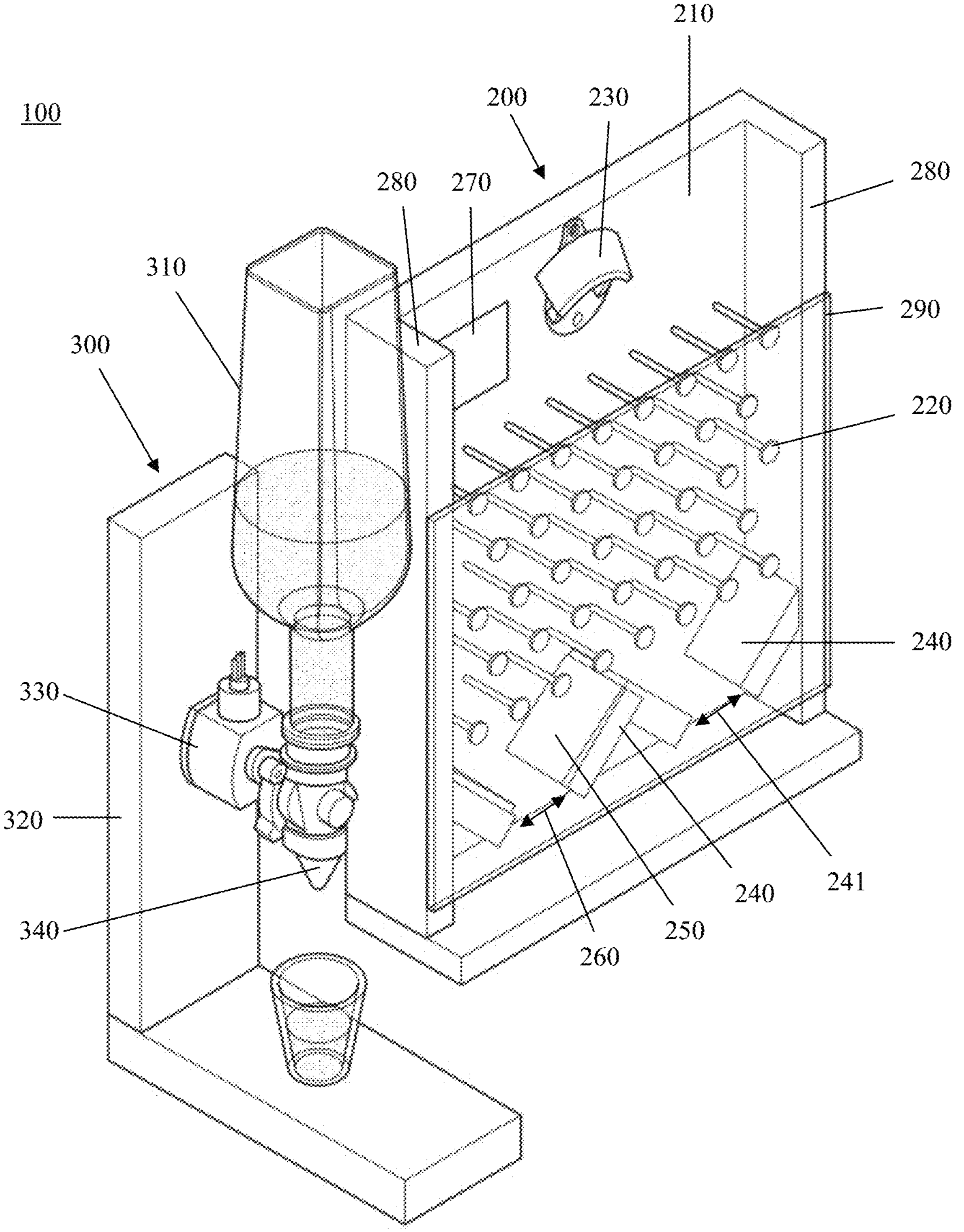
FIG. 1 is a perspective view of a game system according to the first embodiment of the present invention.
Figure 2:
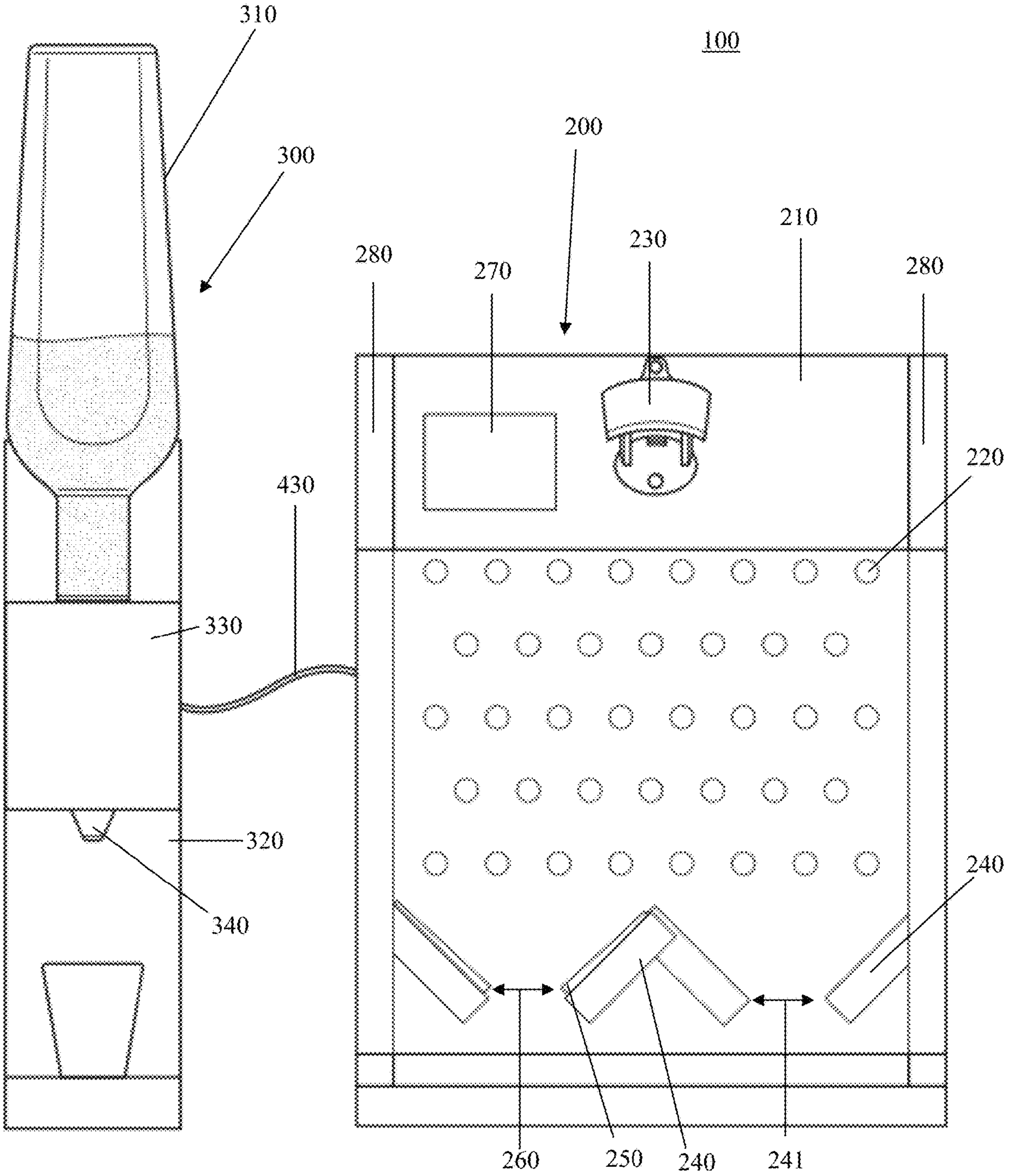
FIG. 2 is a front view of a game system according to the first embodiment of the present invention.

FIGS. 1 and 2 are respectively perspective view and front view of a game system 100 according to the first embodiment of the present invention. The game system 100 includes a playfield 200 and a prize dispenser 300 electrically connected with each other. A player engages with the game system 100 by dropping a play object on the playfield 200 to potentially trigger a switch to send out a winning signal to the prize dispenser 300. The prize dispenser 300, after receiving the winning signal, will dispense a predetermined prize that corresponds to the winning signal.

As illustrated in FIGS. 1 and 2, the playfield 200 includes a peg board 210 oriented vertically and a plurality of deflector pegs 220 attached to the peg board 210 and oriented horizontally, and an object introducer 230 configured to receive a play object and drop the play object onto the deflector pegs 220. In the present embodiment, the play object is a bottle cap removed from a beer bottle and the object introducer 230 is a bottle opener configured to remove a bottle cap from a beer bottle. A player can use the object introducer 230 to remove the bottle cap and at the same time drop the bottle cap onto the deflector pegs 220 to engage the game system 100. In another embodiment, the play object can be anything other than a bottle cap, such as a small ball. Then the object introducer 230 can simply be any device that can accept the small ball and drop said ball onto the deflector pegs 220. In another embodiment, the game system 100 can operate without the object introducer 230 and the player can engage the game system 100 by simply dropping the play object onto the deflector pegs 220.

The playfield 200 further includes four blocks 240 attached to the peg board 210 and below the deflector pegs 220, wherein each block 240 is oriented slantwise to form a slope. As illustrated in FIGS. 1 and 2, a gap exists between two adjacent blocks 240 and forms an exit 241 configured to receive the play object falling straight from the deflector pegs 220 or sliding down the block 240. The playfield 200 of the present embodiment has two pairs of blocks 240 that respectively form two exits 241, but is not limited thereto. In different embodiments, the playfield 200 can have more than two pairs of blocks 240 to form more than two exits 241.

The playfield 200 further includes a plurality of detectors 250 disposed on two of the blocks 240 and configured to detect whether a play object lands on the corresponding block 240 or passes through the gap between two adjacent blocks 240. The above-mentioned gap will be designated as a prize exit 260. The detector 250 can be a metal detector (if the play object is made of metal), a passive infrared sensor, an ultrasonic sensor, a microwave sensor, a tomographic sensor, or a combination of conventional motion and object detectors. In different embodiments, the playfield 200 can use video camera and associated software to determine whether a play object lands on the corresponding block 240 or passes through the prize exit 260 between two adjacent blocks 240.

The playfield 200 also includes a display 270 for show a predetermined prize to be won if the play object passes through the prize exit 260, wherein the predetermined prize will be further discussed below. The display 270 of the present embodiment is a liquid crystal display (LCD) and can be configured to include a touchscreen for accepting user inputs such as adjustments of the predetermined prize.

The play object is intended to eventually pass through only one of the exits. Thus, to make sure that the play object does not bounce off the deflector pegs 220, the playfield 200 further includes a pair of divider boards 280 attached to two ends of the peg board 210 and extending perpendicularly from the peg board 210. The playfield 200 also includes a screen 290 whose two ends are respectively attached the divider boards 280 as illustrated in FIGS. 1 and 2. The screen 290 covers the deflector pegs 220 and the blocks 240 to make sure that the play object, once dropped into the deflector pegs 220, will not bounce off the playfield 200 in a direction substantially perpendicular to the peg board 210. As illustrated in FIGS. 1 and 2, the peg board 210, divider boards 280, and screen 290 together enclose a space for the play object to bounce around the deflector pegs 220 to eventually pass through only one of the exits.

The prize dispenser 300 of the present embodiment is configured to dispense a predetermined amount of drink from a prize source 310. In the present embodiment, the prize source 310 is an open liquid bottle containing spirit or liquor, but is not limited thereto. In different embodiments, the prize source 310 can also be soft drink container or other beverage container. The prize dispenser 300 includes a stand 320, a valve 330 attached to the stand 320, and a funnel 340 coupled with the valve 330. The valve 330 of the present embodiment is an electromechanically operated solenoid valve and is used to shut-off, release, dose, distribute or mix fluids. The valve 330 can be one-solenoid valve or two-solenoids valve. The valve 330 can be either direct current or alternating current powered. The valve 330 releases a predetermined amount of drink from the prize source 310 whenever the detector 250 detects that a play object passes through the gap between two adjacent blocks 240. Preferably, a container such as a shot glass will be placed directly below the valve 330 so that the released drink can flow through the funnel 340 and fall into the shot glass.

Figure 3:
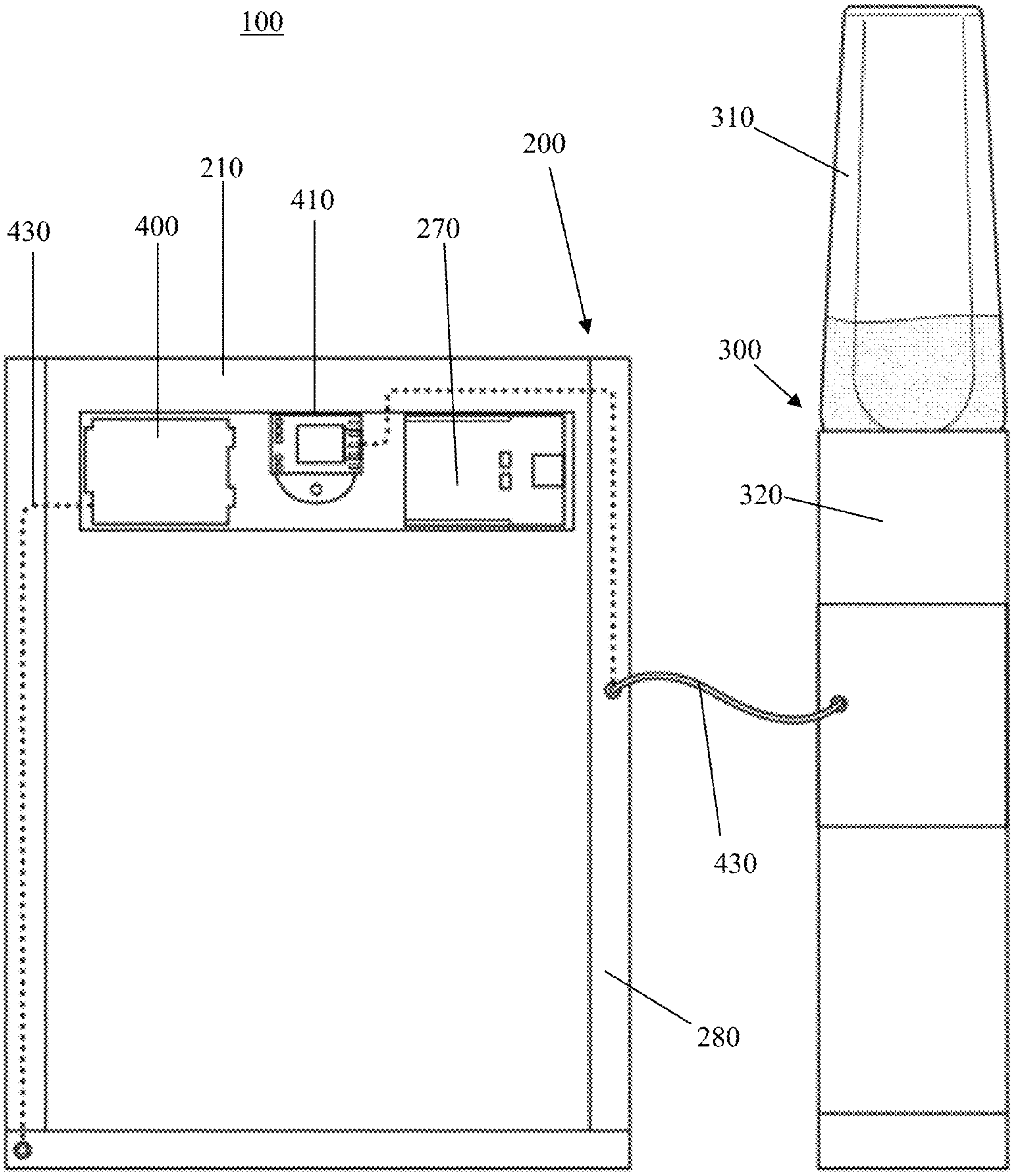
FIG. 3 is a back view of the game system of the first embodiment of the present invention.

FIG. 3 is a back view of the game system of the first embodiment of the present invention. The game system 100 further includes a processor 400, a relay 410, a relay cable 420, and a power cable 430. The relay cable 420 is used to electrically connect the relay 410 with the valve 330 of the prize dispenser 300. The power cable 430 is used to connect the processor 400 to a power source such as a battery that provide low voltage direct current (such as 12V DC) or a transformer that converts electricity from high alternating current to lower voltage direct current.

The processor 400 has an internal memory that contains commands to operate the game system 100 and is configured to execute said commands. The above-mentioned commands includes powering up the game system 100, processing user input to adjust the predetermined amount of drink released from the prize source 310 and instructing the valve 330 to release drinks from the prize source 310. The processor 400 is connected to the display 270 and is configured to process the user input via the display 270. In the present embodiment, the user input relates mainly to how much drink to be dispensed every time a play object passes through the prize exit 260. The processor 400 is connected to the detector 250 to receive a winning signal which signifies that a play object has just fallen through the prize exit 260. The processor 400 then sends an instruction through the relay 410 and the relay cable 420 to the valve 330 to open for a predetermined amount of time so that the predetermined amount of drink can be dispensed from the prize source 310.

Also, in the present embodiment, the relay cable 420 is used to transfer signals between the playfield 200 and a prize dispenser 300. In different embodiments, wireless communication options such as Wi-Fi and Bluetooth Technologies can be used to transfer signals wirelessly between the playfield 200 and the prize dispenser 300.

Figure 4:
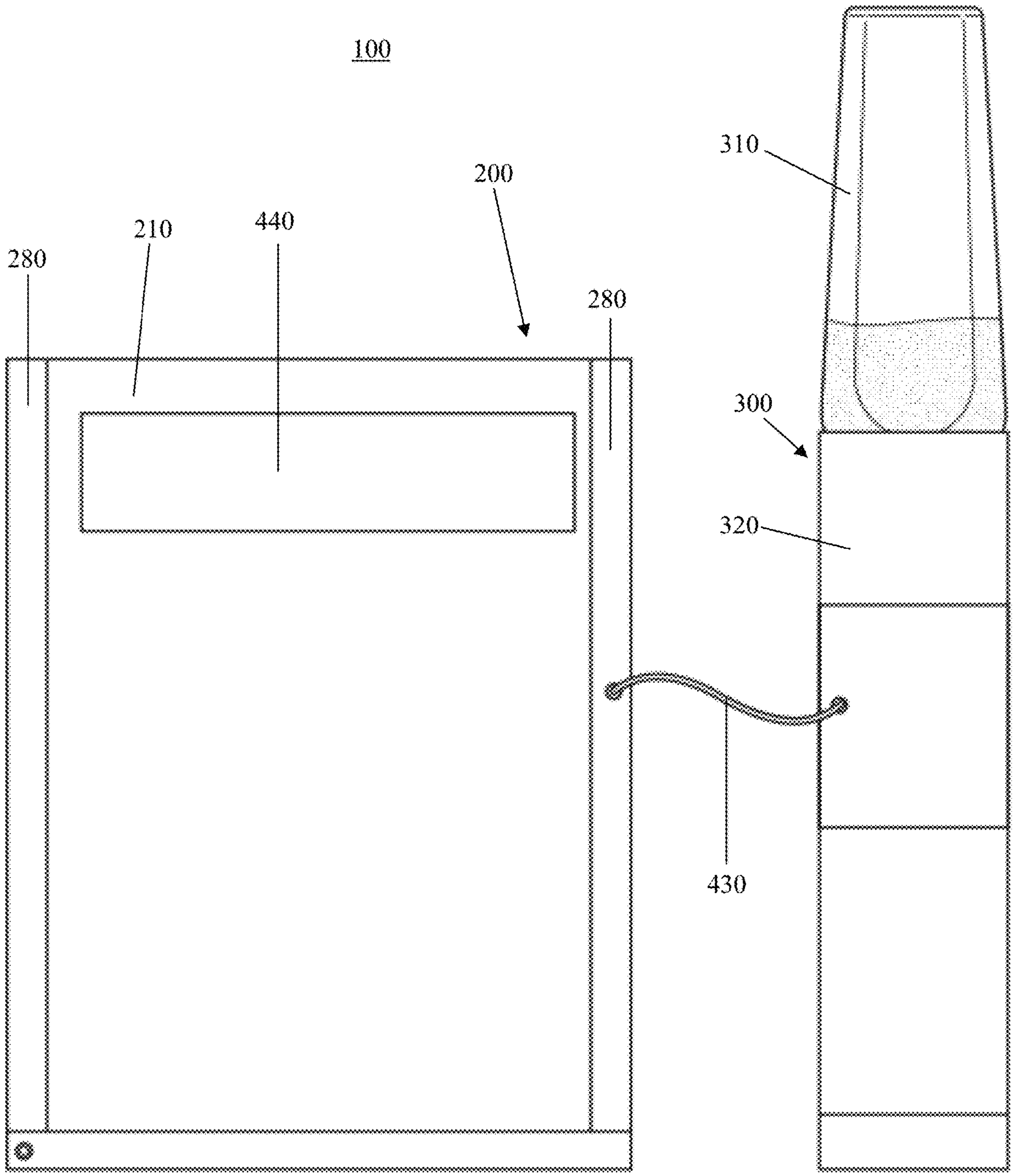
FIG. 4 is another back view of the game system of the first embodiment of the present invention, further illustrating a cover for shielding the processor, relay, and backside of display.

FIG. 4 is another back view of the game system 100 of the first embodiment of the present invention. The game system 100 further includes a cover 440 to shield the processor 400, relay 410, and backside of display 270.

Figure 5:
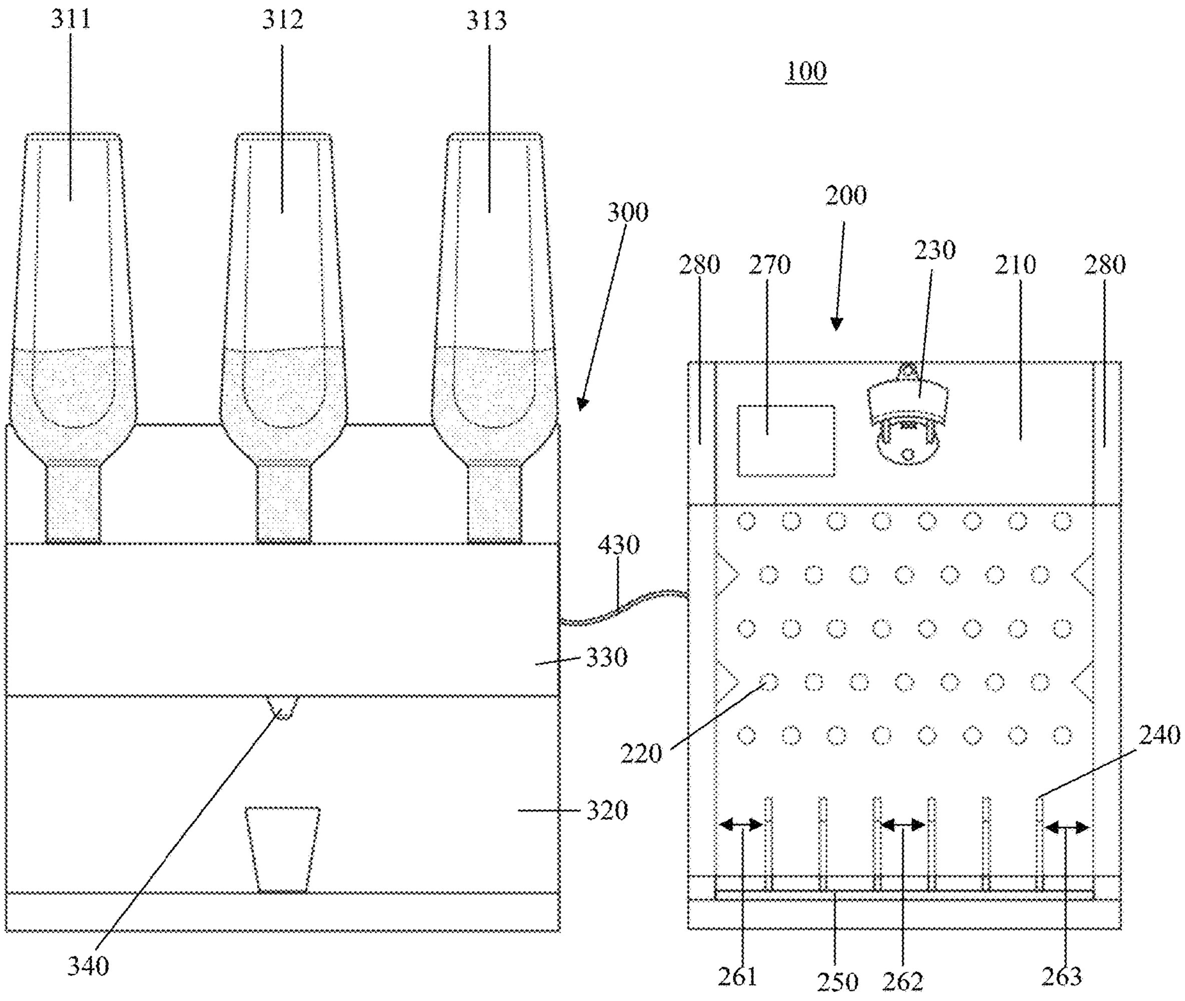
FIG. 5 is a front view of the game system in the second embodiment of the present disclosure.

FIG. 5 is a front view of the game system 100 in another embodiment of the present disclosure. The game system 100 of the present embodiment provides for a plurality of prizes to be won by the player. In the present embodiment, the prize dispenser 300 includes a first prize source 311, a second prize source 312, and a third prize source 313. The prize dispenser 300 includes a valve 330 configured to release a predetermined amount of drink from one of the prize source 311, 312, 312, whenever the detector 250 detects that a play object passes through a prize exit. Preferably, a container such as a shot glass will be placed directly below the valve 330 so that the released drink can flow through the funnel 340 and fall into the shot glass. By default, the valve 330 is closed until receiving an instruction from the processor 400 to open for a predetermined amount of time.

In other embodiments, the prize dispenser 300 can includes a plurality of valves each is coupled with one of the prize sources, wherein each of the valves is configured to control when a predetermined amount of drink can be released from the corresponding prize source. For instance, the prize dispenser 300 can include a first valve corresponding to the first prize source 311, a second valve corresponding to the second prize source 312, and a third valve corresponding to the third prize source 313.

On the other hand, the playfield 200 includes a first prize exit 261 corresponding to the first prize source 311, a second prize exit 262 corresponding to the second prize source 312, and a third prize exit 263 corresponding to the third prize source 313. The playfield 200 includes a single detector 250 configured to determine which exit does the play object pass through. In other embodiments, the playfield 200 can include a plurality of detectors each corresponding to one of the prize exits 261, 262, 263. For instance, the playfield 200 can include a first detector disposed near the first prize exit 261, a second detector disposed near the second prize exit 262, and a third detector disposed near the third prize exit 263. The three separate detectors are each configured to detect whether the play object passes through the corresponding prize exit 261, 262, 263. When a play object passes through the first prize exit 261, the detector 250 informs the processor 400 with a signal. The processor 400 can then instruct the first valve 331 to open for a predetermined amount of time so that the predetermined amount of drink can be dispensed from the first prize source 311.

Figure 6:
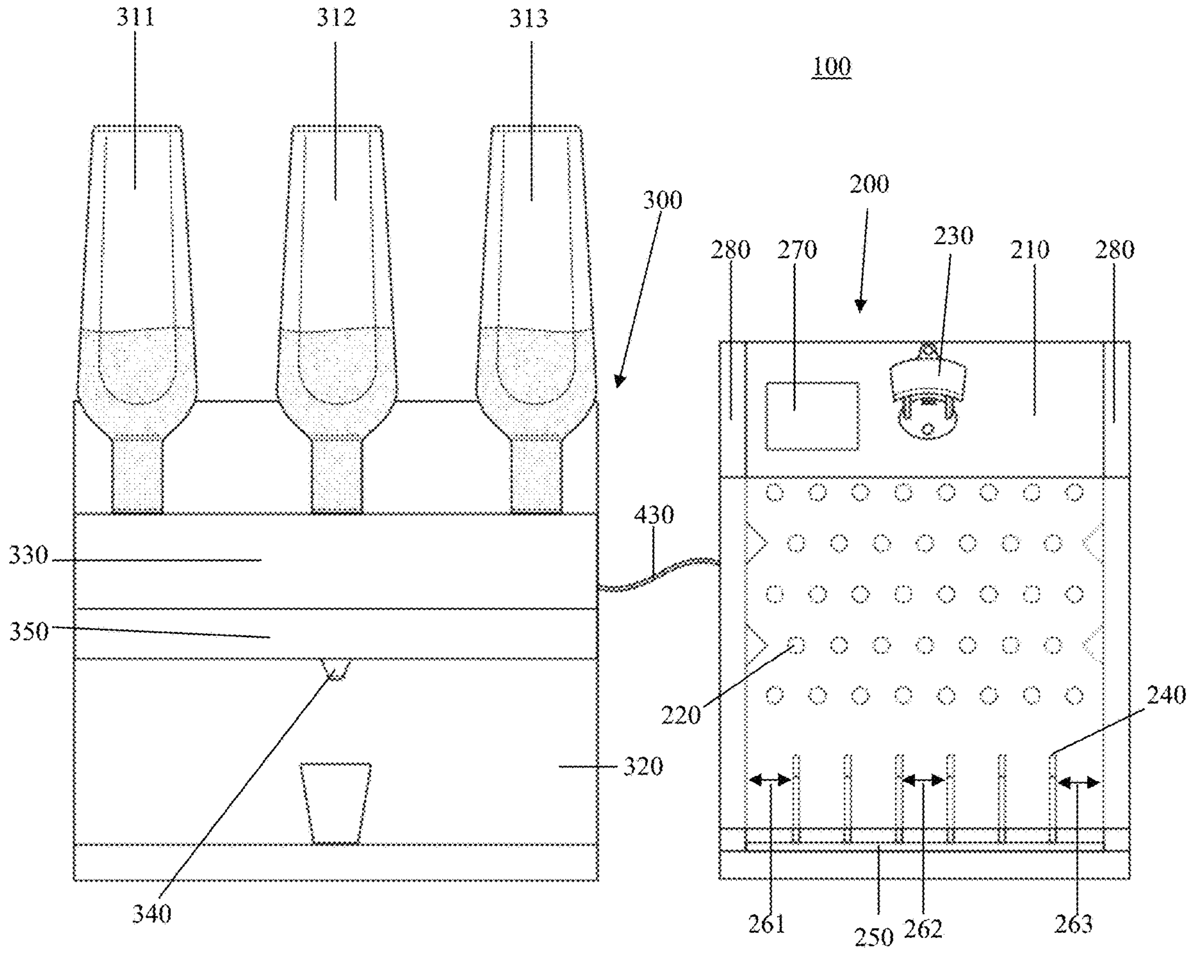
FIG. 6 is a front view of the third embodiment of the game system of the present disclosure, wherein the game system includes a prize maker for making prizes using contents of the prize sources.

FIG. 6 is a front view of another embodiment of the game system 100 of the present disclosure. The prize dispenser 300 further includes a prize maker 350 configured to create a plurality of different prizes by mixing the contents of the prize sources 311, 312, 313, wherein the prize maker 350 is connected to the valve 330. For instance, the first prize associated with the first prize exit 261 can be set to be the mixture of the contents from the first prize source 311 and the second prize source 312. When a play object passes through the first prize exit 261, the detector 250 informs the processor 400 with a signal. The processor 400 can then instruct the valve 330 to open for a predetermined amount of time so that the predetermined amount of drink can be dispensed from the first prize source 311 and the second prize source 312 to the prize maker 350. The prize maker 350 can then make a first prize by mixing the contents of the first and second prize sources 311, 312.

In the embodiment illustrated in FIG. 6, the first prize is predetermined to be the mixture of the contents from the first and second prize sources 311, 312, but is not limited thereto. The prizes can be set to be either content from only one of the prize sources 311, 312, 313 or any combination of contents from two or more of the prize sources 311, 312, 313. Accordingly, the game system 100 can have as many prizes as the number of prize exits designated in the playfield 200. Also, in the embodiments discussed above, the prize sources 310, 311, 312, 313 contain liquid, but are not limited thereto. In other embodiments, the prize sources 310, 311, 312, 313 can contain yogurt, milk, soft drinks, ice cream and other foods or refreshments.

Figure 7:
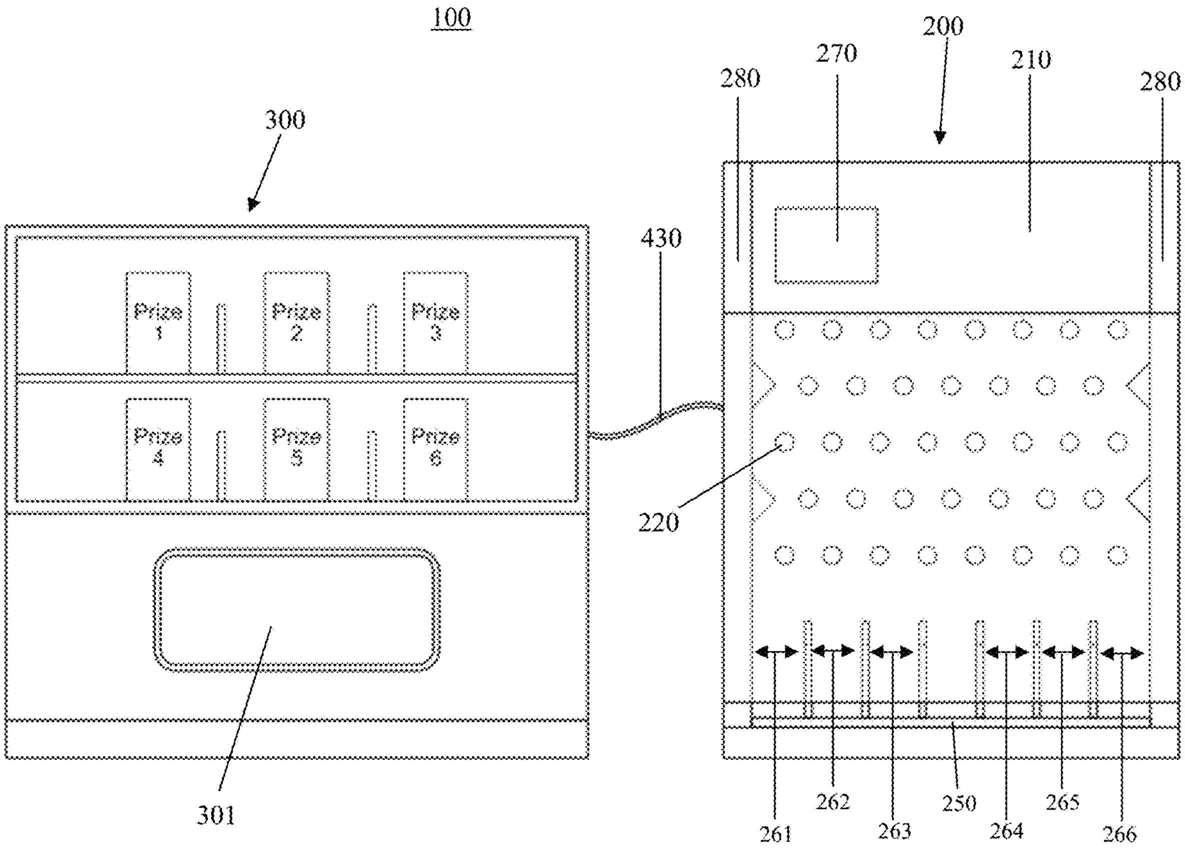
FIG. 7 is a front view of the game system according to the fourth embodiment of the present disclosure.

FIG. 7 is a front view of the game system 100 according to another embodiment of the present disclosure. The game system 100 includes a playfield 200 and a prize dispenser 300, wherein the playfield 200 includes a plurality of prize exits 261, 262, 263, 264, 265, 266, and corresponding detectors 251, 252, 253, 254, 255, 256. On the other hand, the prize dispenser 300 includes six different prizes 1, 2, 3, 4, 5, 6, wherein each of the prizes 1, 2, 3, 4, 5, 6 corresponds to one of the prize exits 261, 262, 263, 264, 265, 266. In the present embodiment, the prize dispenser 300 includes six shelve spaces configured to accommodate the prizes 1, 2, 3, 4, 5, 6, wherein a plurality of the same prize may be disposed in the same space.

The playfield 200 includes a single detector 250 configured to determine which exit does the play object pass through. In other embodiments, the playfield 200 can include a plurality of detectors each corresponding to one of the prize exits 261, 262, 263, 264, 265, 266. For instance, the playfield 200 can include six separate detectors each disposed near one of the prize exits 261, 262, 263, 264, 265, 266. The six separate detectors are each configured to detect whether the play object passes through the corresponding prize exit 261, 262, 263, 264, 265, 266. When the play object passes through one of the prize exits, the playfield 200 will send out a winning signal to the prize dispenser 300 which then dispenses the prize corresponding to the prize exit. The prize dispenser 300 dispenses prize by pushing it over the corresponding shelve spaces to drop to the bottom space of the prize dispenser 300. The prize dispenser 300 includes a dispenser opening 301 connected to the bottom space of the prize dispenser 300, so that the player can obtain the prize dropped on the bottom space through the dispenser opening 301.

Figure 8:
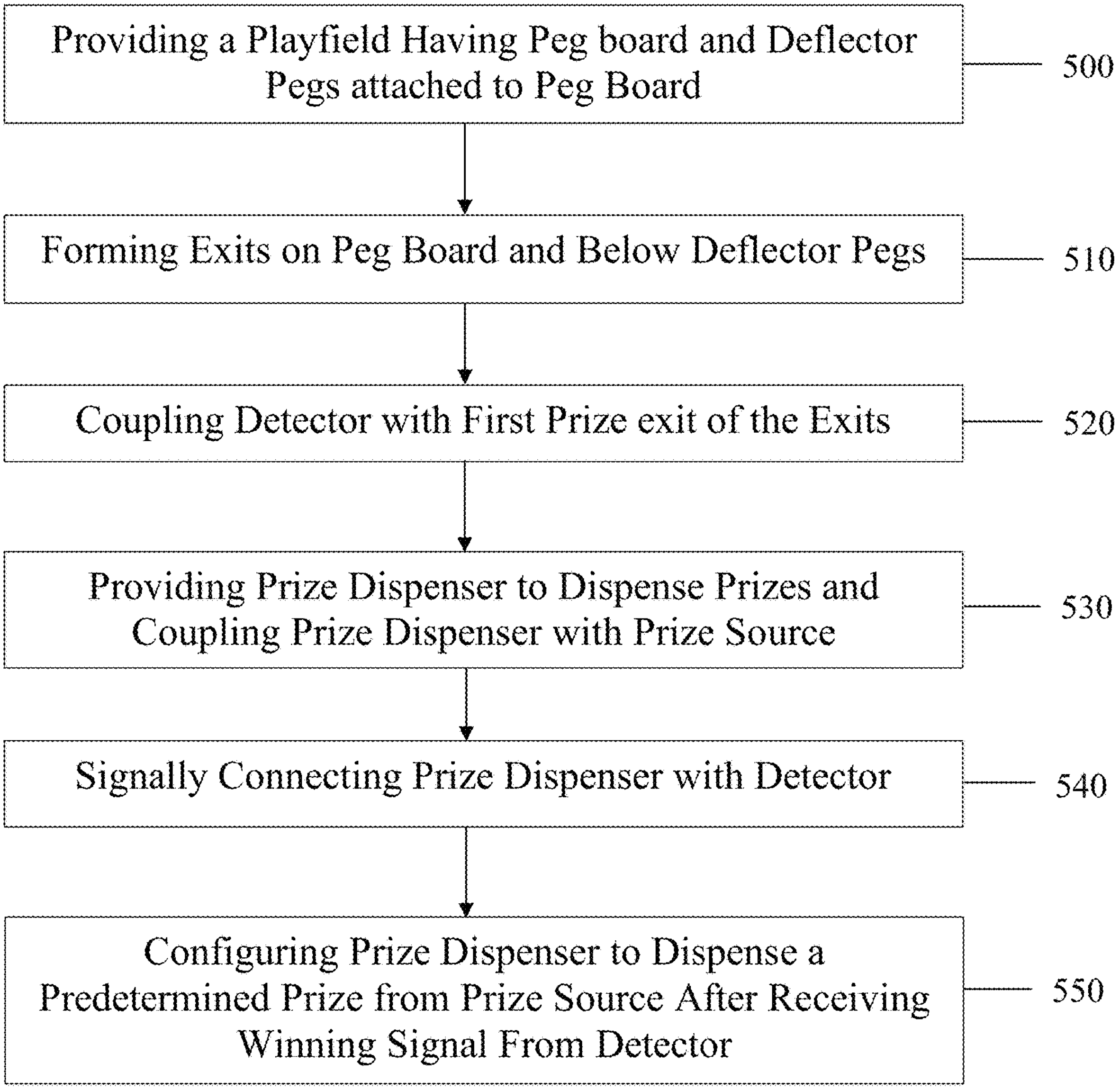
FIG. 8 is a flow chart of a method of operating a game system according to the fifth embodiment of the present disclosure.

FIG. 8 is a flow chart of a method of operating a game system according to one embodiment of the present disclosure. The method includes step 500 of providing a playfield having a peg board and a plurality of deflector pegs attached to the peg board and oriented substantially horizontally. The method further includes step 510 of forming a plurality of exits on the peg board and below the deflector pegs. The method then can perform step 520 of coupling a detector with a first prize exit of the plurality of exits, wherein the detector is configured to generate a first winning signal when detecting the object traversing through the first prize exit. Steps 500-520 relates to the making of a playfield for a play object to be dropped onto the deflector pegs, deflected by the deflector pegs, and eventually pass through one of the exits.

The method further includes step 530 of providing a prize dispenser configured to dispense prizes and coupling the prize dispenser with a prize source. The method further includes step 540 of signally connecting the prize dispenser with the detector, in order for the detector to transmit the first winning signal to the dispenser portion. In one embodiment, step 540 includes signally connecting a relay with the valve and the detector and configuring the relay to drive the valve to open after receiving the first winning signal from the detector. Step 540 may also includes electrically connecting a power supply to the relay provide electricity for the relay to drive the valve, wherein the power supply is preferably a battery or power mains. Last but not least, the method includes step 550 of configuring the prize dispenser to dispense a predetermined prize from the prize source after receiving the first winning signal from the detector.

In one embodiment, the prize source is a single liquor bottle and the prize dispenser dispenses a predetermined amount of liquor from the prize source after receiving the first winning signal from the detector. Step 530 of providing the prize dispenser includes: coupling a valve of the dispenser portion with the prize source having at least a first drink, coupling a funnel of the dispenser portion with the valve, and configuring the valve to selectively close or open for the first drink to flow from the prize source, through the valve, and exit through the funnel.

In another embodiment, the prize source includes a plurality of refreshment containers each contains different liquor or soft drinks. Thus, step 520 can further include coupling the detector with a newly designated second prize exit of the existing exits and configuring the detector to generate a second winning signal when detecting the object traversing through the second prize exit. On the other hand, step 550 can further include configuring the prize dispenser to dispense prizes based on the corresponding winning signal from the detector. For instance, the prize dispenser will dispense a first drink after receiving the first winning signal from the detector and dispense a second drink after receiving the second winning signal from the detector.

In another embodiment, contents of different refreshment containers can be used to make a prize to be dispensed. Thus, Step 550 can also include providing a drink maker and configuring the drink maker to create the predetermined prize using a first drink and a second drink from different containers.

In another embodiment, the user of the game system may want to adjust the predetermined prize to be dispensed by the prize dispenser. Thus, step 500 may further include configuring a player interface to receive player inputs, signally connecting the player interface with the dispenser portion, and configuring the player interface to adjust the predetermined prize to be dispensed by the prize dispenser based on the player input.

The foregoing descriptions of specific implementations have been presented for purposes of illustration and description. They are not intended to be exhaustive or to limit the invention to the precise forms disclosed, and modifications and variations are possible in view of the above teaching. The exemplary implementations were chosen and described to best explain the principles of the invention and its practical application, to thereby enable others skilled in the art to best utilize the invention and its implementations with modifications as suited to the use contemplated.

It is therefore submitted that the invention has been shown and described in the most practical and exemplary implementations. It should be recognized that departures may be made which fall within the scope of the invention. With respect to the description provided herein, it is submitted that the optimal features of the invention include variations in size, materials, shape, form, function, manner of operation, assembly, and use. All structures, functions, and relationships equivalent or essentially equivalent to those disclosed are intended to be encompassed by the invention.

The invention claimed is:

1. A game system, comprising:
- a playfield, including:
  - a peg board oriented substantially vertically,
  - plurality of deflector pegs attached to the peg board and oriented substantially horizontally;
  - an object introducer attached to the peg board and located above the deflector pegs, wherein the object introducer is configured to receive an object and drop the object onto the deflector pegs;
  - a plurality of exits located below the deflector pegs, wherein one of the exits receives the object traversing over the peg board and deflected by the deflector pegs; and
  - a detector coupled with a first prize exit of the plurality of exits and configured to generate a first winning signal when detecting the object traversing through the first prize exit; and
- a prize dispenser configured to dispense a prize, including:
  - a dispenser portion coupled with a prize source and configured to dispense a predetermined prize from the prize source including a first drink; wherein the dispense portion is signally coupled with the detector and configured to dispense the predetermined prize to free fall after receiving the first winning signal from the detector, wherein the dispenser portion includes:
  - a valve configured to couple with the prize source to receive the first drink; and
  - a funnel coupled with the valve, wherein the valve selectively closes or opens for the first drink to flow from the prize source, through the valve, and exit through the funnel.

2. The game system of claim 1, wherein the prize source further includes a second drink, the detector is coupled with a second prize exit of the plurality of exits and configured to generate a second winning signal when detecting the object traversing through the second prize exit; wherein the valve selectively closes or opens for the second drink to flow from the prize source, through the valve, and exit through the funnel, after the prize dispenser receives the second winning signal from the detector.

3. The game system of claim 1, further comprising a relay signally connected to the valve and the detector, wherein the relay receives the first winning signal from the detector and then drives the valve to open and let the content flow through the valve.

4. The game system of claim 3, further comprising a power supply electrically connected to the relay to provide electricity for the relay to drive the valve.

5. The game system of claim 3, further comprising a relay wire connected to the relay and the valve, wherein the detector wirelessly transmits the first winning signal to the relay.

6. The game system of claim 1, wherein the prize source includes at least a first drink and a second drink, the prize dispenser further includes a prize maker configured to receive the first drink and the second drink and create the predetermined prize to be dispensed.

7. The game system of claim 1 further including a user interface configured to receive a user input and adjust the predetermined prize to be dispensed from the prize dispenser.

8. The game system of claim 1, wherein the prize source has a first prize and a second prize, the detector is coupled with a second prize exit of the plurality of exits and configured to generate a second winning signal when detecting the object traversing through the second prize exit, the prize dispenser is configured to dispense the first prize to free fall after receiving the first winning signal from the detector, the prize dispenser is configured to dispense the second prize to free fall after receiving the second winning signal from the detector.

9. The game system of claim 1, further comprising:

a first divider board and second divider board, each coupled with one end of the peg board and extending perpendicularly from the peg board; and a screen attached to the first and second divider boards and configured to cover the deflector pegs and the exits.

10. A method of operating a game system, comprising:

providing a peg board and a plurality of deflector pegs attached to the peg board and oriented substantially horizontally;

forming a plurality of exits on the peg board and below the deflector pegs;

attaching an object introducer to the peg board and above the deflector pegs, wherein the object introducer is configured to receive an object and drop the object onto the deflector pegs, the object traverses over the peg board and gets deflected by the deflector pegs;

coupling a detector with a first prize exit of the plurality of exits and configuring the detector to generate a first winning signal when detecting the object traversing through the first prize exit;

providing a prize dispenser configured to dispense prizes and coupling a dispenser portion of the prize dispenser with a prize source, wherein the step of providing the prize dispenser further includes:

coupling a valve of the dispenser portion with the prize source having at least a first drink;

coupling a funnel of the dispenser portion with the valve; and configuring the valve to selectively close or open for the first drink to flow from the prize source, through the valve, and exit through the funnel;

signally connecting the dispenser portion with the detector; and configuring the dispenser portion to dispense a predetermined prize from the prize source to free fall after receiving the first winning signal from the detector.

11. The method of claim 10, wherein the step of dispensing the predetermined prize includes:

coupling the detector with a second prize exit of the plurality of exits;

configuring the detector to generate a second winning signal when detecting the object traversing through the second prize exit; and configuring the valve to selectively close or open for the second drink to flow from the prize source, through the valve, and exit through the funnel, after the prize dispenser receives the second winning signal from the detector.

12. The method of claim 10, further comprising:

signally connecting a relay with the valve and the detector;

configuring the relay to drive the valve to open after receiving the first winning signal from the detector.

13. The method of claim 12, further comprising electrically connecting a power supply to the relay provide electricity for the relay to drive the valve.

14. The method of claim 12, wherein the step of signally connecting a relay with the valve and the detector includes:

electrically connecting a relay wire with the relay and the valve; and configuring the detector and the relay to wirelessly communicate with each other, wherein the detector can wirelessly transmit the first winning signal to the relay.

15. The method of claim 10, wherein the step of dispensing the predetermined prize includes:

sending at least a first drink and a second drink of the prize source to a prize maker of the prize dispenser; and configuring the prize maker to create the predetermined prize using the first drink and the second drink.

16. The method of claim 10, further comprising:

configuring a player interface to receive user inputs related to the predetermined prize to be dispensed by the prize dispenser;

signally connecting the player interface with the dispenser portion; and configuring the player interface to adjust the predetermined prize to be dispensed by the prize dispenser based on the user input.

17. The method of claim 10, wherein the step of dispensing the predetermined prize includes:

coupling the detector with a second prize exit of the plurality of exits;

configuring the detector to generate a second winning signal when detecting the object traversing through the second prize exit;

configuring the prize dispenser to dispense a first prize from the prize source to free fall after receiving the first winning signal from the detector; and configuring the prize dispenser to dispense a second prize from the prize source to free fall after receiving the second winning signal from the detector.

18. A game system, comprising:

a playfield, including:

a peg board oriented substantially vertically, plurality of deflector pegs attached to the peg board and oriented substantially horizontally;

an object introducer attached to the peg board and located above the deflector pegs, wherein the object introducer is configured to receive an object and drop the object onto the deflector pegs;

a plurality of exits located below the deflector pegs, wherein one of the exits receives the object traversing over the peg board and deflected by the deflector pegs; and a detector coupled with a first prize exit and a second prize exit of the plurality of exits, the detector being configured to generate a first winning signal when detecting the object traversing through the first prize exit, the detector being configured to generate a second winning signal when detecting the object traversing through the second prize exit;

a drink source having a first drink and a second drink;

a drink dispenser, including:

a dispenser portion coupled with the drink source and configured to dispense a drink from the drink source; wherein the dispense portion is signally coupled with the detector and to receive electrical signals, the dispense portion is configured to dispense the first drink after receiving the first winning signal from the detector, the dispense portion is configured to dispense the second drink after receiving the second winning signal from the detector, the dispenser portion includes:

a valve configured to couple with the prize source to receive the first drink and the second drink; and a funnel coupled with the valve, wherein the valve selectively closes or opens for at least one of the first drink and the second drink to flow from the prize source, through the valve, and exit through the funnel.

* * * * *